United States Patent Office 3,822,209
Patented July 2, 1974

---

3,822,209
LUBRICANT ADDITIVES
Gordon G. Knapp, Southfield, and Norman A. Le Bel, Detroit, Mich., assignors to Ethyl Corporation, Richmond, Va.
No Drawing. Filed Feb. 1, 1966, Ser. No. 523,886
Int. Cl. C10m *1/32, 1/38;* C07c *87/26;* C07d *51/70*
U.S. Cl. 252—47                  16 Claims

ABSTRACT OF THE DISCLOSURE

High molecular weight allylic amines are made by halogenating high molecular weight alpha or beta olefins followed by reaction with ammonia or a primary or secondary monoamine. The products are dispersants for lubricating oil.

---

This invention relates to novel allylic amines, a novel method for their preparation and lubricant compositions containing said allylic amines.

A feature of present day lubricating oils used in internal combustion engines is the presence of chemical additives of various types. These additives in general improve certain characteristics of the lubricating media, for example, corrosion resistance, wear, pour point, etc., so that the useful life as well as the efficiency of the lubricant is increased. Some of the more important additives are those which serve to disperse undesirable materials introduced into the oil during the operation of the engine, allowing their removal during periodic oil changes. This serves to keep the engine clear and sludge free. These additives are referred to as dispersants. Their primary function is to inhibit the deposition of sludge.

Sludge is an agglomeration of various contaminants found in or formed while the oil is in use. Metal-containing compounds such as the metal salts of phosphorous sulfide-olefin reaction products have found extensive use in this application. Although effective as dispersants, these compounds on decomposing leave a metallic residue or "ash" which is detrimental to the engine. More recently, a new type of dispersant which contains no metallic elements has been developed. This type of dispersant is called an "ashless" dispersant since on decomposing, no metallic residue is left.

Because of this ashless feature, these dispersants are in ever increaing demand. Typical of the ashless detergents available today are the alkenyl succinic anhydride adducts and special polymers such as alkenyl methacrylate/maleic anhydride/amine terpolymers as described in U.S. 3,160,612. These compounds often require complicated and time consuming methods for their preparation. In view of the foregoing discussion, it is evident that new ashless dispersants which can be prepared by a simple, direct method would be valuable contributions to the state of the art.

It has been discovered that certain polyolefin allylic amines are good ashless dispersants. Further, a process for preparing these amines which is simple, quick and economical has also been discovered.

Accordingly, an object of this invention is to provide novel polyolefin allylic amines. Another object of this invention is to provide a simple and comparatively rapid process for the preparation of these polyolefin allylic amines. A further object of this invention is to provide improved lubricant compositions containing these polyolefin allylic amines as ashless dispersants. Other objects of this invention will be made clear by the disclosure and claims which follow.

These and other objects of this invention are accomplished by providing an allylic amine selected from the group consisting of (a) Compounds having the formula

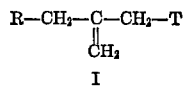

I wherein R is an alkyl radical having a molecular weight of from about 700 to 1400, T is a radical selected from the group of amine radicals consisting of (i) 

and (ii) 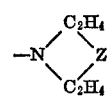

wherein $R_1$ and $R_2$ are independently selected from the group consisting of hydrogen, alkyl groups containing from 1 to 8 carbon atoms and substituted alkyl groups containing 1 to 8 carbon atoms wherein the substituting groups are selected from —SH, —OH and halogen, Z is selected from —O—, —NH—, —S— and —CH$_2$—, (b) Compounds having the formula

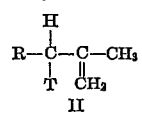

II wherein R and T are as stated above and (c) Compounds having the formula

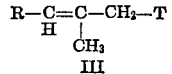

III wherein R and T are as stated above.

The term "allylic" in "polyolefin allylic amine" indicates that the amine group is attached to a carbon atom which is attached directly to a carbon atom of a double bond. In the allylic amines of this invention, the double bond is in either the 1 or 2 position in the molecule.

A preferred embodiment of this invention encompasses polyolefin allylic amines having Formula I, II or III, wherein R is a branched chain alkyl radical having a molecular weight of 700 to 1100. A more preferred embodiment of this invention is provided by polyolefin allylic amines having Formula I, II or III wherein R is a polymer of isobutylene having a molecular weight of 700 to 1100, i.e., a polyisobutyl allylic amine.

A highly preferred embodiment of this invention is provided by polyisobutyl allylic amines having Formula I, II or III, wherein T is the

group wherein $R_1$ and $R_2$ are independently selected from the group consisting of hydrogen, methyl and ethyl. An especially preferred embodiment of this invention is provided by polyisobutyl allylic amines having Formulae I, II or III wherein T is a heterocyclic amine group having the formula

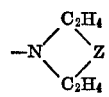

wherein Z is selected from —NH— and —O—.

A most preferred embodiment of this invention is provided by the polyisobutyl allylic amines having Formulae I, II or III wherein T is the hydroxy amine radical having the formula

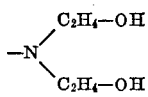

The allylic amines of this invention are prepared by a novel process which comprises reacting an allylic halide having the formula

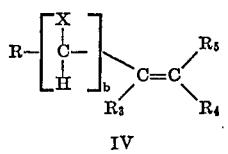

IV wherein R is an alkyl radical having a molecular weight of 700 to 1400, X is a halogen having an atomic weight of at least 35, $b$ is an integer selected from 0 and 1 such that when (1) $b$ is 0 and $R_3$ is hydrogen, $R_4$ is $-CH_2X$ and $R_5$ is $-CH_3$, (2) $b$ is 0 and $R_3$ is $-CH_2X$, $R_4$ and $R_5$ are hydrogen and (3) when $b$ is 1, $R_3$ is $-CH_3$ and $R_4$ and $R_5$ are hydrogen; with a nitrogenous compound having one trivalent nitrogen atom having at least one replaceable hydrogen bonded to said nitrogen atom. The structural illustration of the allylic halide in Formula IV indicates that when $b$ is 0, the R group is attached directly to the carbon atom of the double bond. The generic term, polyolefin allylic halide will be used to describe compounds having Formula IV; where the R group in Formula IV is a specific polyolefin radical, the compound name will so indicate. Thus, for example, if the R group in Formula IV is derived from polypropylene, the product will be termed a polypropyl allylic halide.

The polyolefin allylic halide (Formula IV) which is required in the process is prepared by halogenating an appropriate polyolefin. A critical feature of the polyolefin to be used in the halogenation is that it has an $\alpha$ or $\beta$ double bond. As a practical matter, commercial polyolefins generally have both $\alpha$ and $\beta$ unsaturation. These commercial polyolefins nevertheless are quite suitable for use in the halogenating reaction. On halogenating these commercial polyolefins, a mixture of allylic halides analogous to the allylic amines of Formulas I, II and III, is obtained.

This reaction can be carried out under relatively mild conditions. The temperature at which the reaction can be carried out may be varied over a wide range. Thus, the halogenation can be accomplished at temperatures ranging from 50 to 150° C. In general, the halogenation is effected by dissolving the polyolefin in a solvent such as benzene, tetrahydrofuran, and the like, and treating the solution with the halogen, for example, chlorine gas, or a halogenating reagent, such as N-bromo succinimide. The polyolefin allylic halide is also obtained by halogenating polyolefin without any solvent being present. The physical characteristics of the polyolefin, for example, its viscosity, will help determine whether a solvent should be used. The halogenation proceeds allylically whether a solvent is used or not. The reaction is generally complete in 15 to 120 minutes. The following examples will illustrate typical allylic halogenation procedures. All parts are by weight unless otherwise specified.

Example 1

A solution of 301 parts of Polybutene-24 (Chevron Chemical Company designation for polyisobutylene of molecular weight about 950) in 120 parts of benzene was placed in a vessel equipped with thermometer, stirrer, gas inlet tube and condenser. The solution was heated to about 73° C. and 22.7 parts of chlorine gas was bubbled through over a period of about one hour.

The reaction vessel was then flushed with nitrogen gas for one hour. The solution was filtered and the solvent was removed by vacuum distillation. The yield was 312 parts of polyisobutyl allylic chloride. The product was a cloudy, orange colored, viscous liquid, which on analysis was found to contain 3.55 percent chlorine. Infrared analysis showed that the compound was unsaturated.

The allylic nature of the polyisobutylene product, chlorinated as in Example 1, was also verified chemically. During the course of the chlorination of the polyisobutylene, hydrogen chloride was evolved and trapped. Analysis showed that one mole of hydrogen chloride was produced for every mole of chlorine consumed. This was positive evidence that the chlorination was a substitution rather than an addition reaction.

The chlorinated polyisobutylene was then reacted with sodium acetate and acetic acid. This reaction was carried out under mild conditions, such that only allylic chloride and tertiary alkyl chloride would be displaced. The chlorine was displaced in the reaction and acetoxy polyisobutylene was obtained. Since an aectoxy derivative would result only if the chloride were allylic, this further confirmed the fact that the chlorinated polyisobutylene was an allylic chloride.

Example 2

A reaction vessel fitted with a thermometer, stirrer and condenser was charged with 94.1 parts of Polybutene-24 (defined in Example 1), 17.8 parts of N-bromo succinimide and 200 parts of benzene. This mixture was refluxed for about 30 minutes. The mixture was then cooled and the solution was filtered. The solvent was stripped and the residue was then redissolved in hexane. This solution was filtered and the solvent was removed by vacuum distillation. A 99 percent yield of the polyisobutyl allylic bromide was obtained as a dark brown viscous liquid. The bromine content of this product was 7.9 percent. Infrared analysis indicated that the compound was unsaturated. Furthermore, it is art-recognized that N-bromo-succinimide will, under these conditions, brominate an olefin allylically.

Since in Examples 1 and 2 the polyolefin used was a commerical polyolefin, the halogenated products obtained were, as previously stated, mixtures of allylic halide analogues of the allylic amines of Formulas I, II and III.

The halogenated polyolefins which are useful in the invented process are the polyolefin allylic halides of the polymers and copolymers of monoolefins such as ethylene, propylene, butylene and the like. Since the parent polyolefins are usually prepared from commercial monoolefins which are mixtures of various olefin isomers, the polyolefin allylic halides prepared therefrom will also be mixtures. These halogenated polyolefins are further characterized as having an $\alpha$ or $\beta$ double bond and a halogen atom in a position allylic thereto. By allylic position, it is meant that the substituted group, in this case a halogen atom, is attached to the carbon atom attached directly to a carbon atom of the double bond. Although the allylic halides prepared from commercial polyolefins are, as described above, mixtures of the halide analogues of the allylic amines of Formulas I, II and III, it is not necessary nor is it practical, to separate these halide isomers. Generally, these mixtures are used directly to prepared the allylic amines of this invention.

The more preferred polyolefin allylic halides are those in which the polyolefin moiety is branched and has a molecular weight of from about 700 to about 1400. A branched polyolefin is one in which the straight chain portion of the polymer molecule has attached to it, at indefinite intervals, lower alkyl groups such as methyl, ethyl and the like. The branched nature of the polyolefin molecule has an effect on the oil solubility of the compound. As a general rule, branching improves the oil solubility of the compounds. Examples of the more preferred polyolefin allylic halides are polypropyl allylic halide and polyethylpropyl allylic halide. The polyethylpropyl radical is that derived from a corresponding copolymer of ethylene and propylene.

A most preferred polyolefin allylic halide is polyisobutyl allylic halide wherein the molecular weight of the polyisobutyl portion of the molecule is 700 to 1100.

The halogen of the polyolefin allylic halide compound is selected from chlorine, bromine and iodine. The reaction will proceed with the polyolefin allylic chloride in exactly the same manner as with the polyolefin allylic bromide and allylic iodide. From an economic standpoint, the polyolefin allylic chloride reactant is preferred; but the polyolefin allylic bromide and iodide are also effective in carrying out the reaction involved in the invented process.

Any nitrogenous compound having at least one trivalent nitrogen atom to which is attached at least one hydrogen atom is capable of being used in the process of the invention. Although not bound by any theory, it is suggested that the reaction mechanism involves reaction of the polyolefin allylic halide with the nitrogenous compound which results in splitting out a molecule of hydrogen halide with the formation of the corresponding polyolefin allylic amine. The meaning of the term allylic in polyolefin allylic amine is the same as previously described herein.

Preferred nitrogenous compounds useful in this process are those compounds selected from the class consisting of compounds having the formula

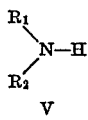

V wherein $R_1$ and $R_2$ are independently selected from the group consisting of hydrogen and alkyl radicals containing from 1 to 8 carbon atoms. The alkyl radicals include substituted alkyl groups containing functional substituents such as —OH, —SH and halogen. Generically, this class of compounds includes ammonia and both primary and secondary amines. The primary amines are those which have two hydrogen atoms bonded directly to the amine nitrogen atom. Examples of the useful primary amines are ethylamine, cyclohexylamine, sec-butylamine, ethanolamine, 3-hydroxy-n-propylamine, 5-amino-n-pentanethiol, 1-amino-6-chlorohexane and the like. Secondary amines are amines which have only one replaceable hydrogen atom attached directly to the amine nitrogen atom. Examples of useful secondary amines are diethylamine, N-methyl-n-propylamine, di-n-hexylamine, di-n-butylamine, diisopropylamine and the like.

Nitrogenous compounds which are more preferred in this process are heterocyclic compounds having the formula

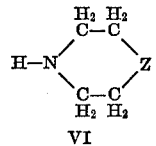

VI wherein Z is selected from the group consisting of —CH$_2$—, —O— and —NH—. Examples of useful heterocyclic compounds (Formula VI) are piperidine, morpholine and piperazine.

A most preferred amine is diethanolamine.

As explained above, the preparation of the polyolefin allylic amine involves replacement of the halogen atom in the polyolefin allylic halide with an amine group, which may be accompanied by a shift of the double bond. This is illustrated by the following general equation:

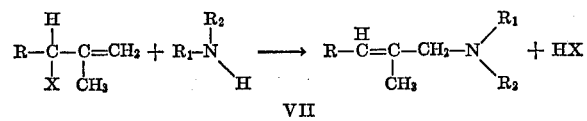

VII

In general, the ratio of reactants in this process is such that there is at least one —N—H group provided for each allylic halide atom present in the polyolefin allylic halide molecule. For example, if polyisobutyl allylic chloride is reacted with diethylamine, a satisfactory molar ratio of the chloride to the amine is 1:1. Good results are obtained when the molar ratio of the polyolefin allylic halide to nitrogenous compound is 6:1 to 1:6. In all cases, however, it is preferred that an excess of the nitrogenous compound be present. Thus, a preferred molar reaction ratio of polyolefin allylic halide to the nitrogenous compound is 1:1.5 to 1:6. By having an excess of nitrogenous compound present during the reaction, the probability of undesirable side reactions occurring is usually reduced. In addition, the excess nitrogenous compound can act as a scavenger to neutralize the hydrogen halide formed in the reaction.

This reaction may be carried out at temperatures ranging from about 50° C. to about 200° C. Where a solvent system is employed, good results are obtained over this entire temperature range. When a solvent is not used, the upper range of temperatures, that is about 140 to 200° C., is preferred. The higher temperature is desirable in the latter case in order to make the polyolefin allylic halide more fluid. This insures more uniform contact of the reactants and improves the reaction rate and yield.

The reaction is satisfactorily carried to completion in from 1 to 24 hours. The reactivity of the polyolefin allylic halide is of such a nature that the reaction is normally complete in from 1 to 8 hours. The time of reaction is not critical and is determined by the nature of the reactants, the temperature used, and other such pertinent factors.

The polyolefin allylic halides employed in this process are generally viscous liquids. The viscosity of polyolefin allylic halides may be reduced in order to facilitate the reaction, by heating them and/or by using a solvent. A solvent system is preferred since lower reaction times and temperatures can be used. Suitable solvents used in this process are those that will not react with nor hinder the reaction between the halide and the nitrogenous compound. Hydrocarbons such as benzene, toluene, and the like, and chlorinated hydrocarbons such as chloroform and the like are examples of useful solvents. Tetrahydrofuran is also a useful reaction solvent. Light hydrocarbon oils may also be used as solvents in this reaction.

The reaction may be carried out conveniently at pressures ranging from sub-atmospheric to above atmospheric. Pressures above atmospheric, e.g. up to 2,000 p.s.i., are especially preferred where solvent systems are used. By carrying out the reaction under pressure in this case, loss of volatile materials is prevented.

The presence or absence of air does not significantly affect the reaction. The reaction proceeds to completion in an air atmosphere as well as in an inert atmosphere such as nitrogen.

The following examples are provided to show how the invented process is carried out. All parts are by weight unless otherwise specified.

Example 3

An autoclave was charged with 150 parts of polyisobutyl allylic bromide (prepared from polyisobutylene of molecular weight about 950) in 140 parts of toluene. Approximately 25 parts of liquid ammonia was introduced into the autoclave and the system was heated to 110° C. The reaction was continued for 6 hours. The material was then discharged from the autoclave and filtered. The toluene was removed by distillation under reduced pressure and a 98 percent yield of a mixture of 1-polyisobutyl-2-methylallylamine, 3-polyisobutyl-2-methylallylamine and 2-(polyisobutylmethyl) allylamine was obtained. On analysis, the product was shown to contain 0.58 percent bromine and 1.46 percent nitrogen.

The products in this and the following examples are mixtures of allylic amines. This is due to the fact that commercial polyolefins are used as starting materials. Since, as will be shown later, these mixed allylic amines are effective dispersants in lubricating oils, separation is not required. However, if separation of these allylic amine isomers was accomplished, for example, by extraction or other appropriate means, the individual allylic amines would also be effective as dispersants. In light of the effectiveness of the mixture of allylic amines as dispersants, a distinct economic advantage is realized by omitting the separation.

Example 4

To a vessel equipped with a stirrer and condenser was added 66.4 parts of polyisobutyl allylic bromide (prepared from polyisobutylene having a molecular weight of about 950), 12 parts of morpholine and 180 parts of benzene. The solution was refluxed for 5.5 hours at 80° C. The mixture was then filtered and the filtrate solvent was removed by distillation. The product was dissolved in 150 parts of hexane and then washed with saturated sodium carbonate solution. The layers were separated. The hexane layer was washed with sodium carbonate solution and dried over sodium sulfate. The solution was then filtered and the hexane removed by vacuum distillation. The final product obtained in good yield was a mixture of 4-(3-polyisobutyl-2-methylallyl)morpholine, 4-(1-polyisobutyl-2-methylallyl)morpholine and 4 - [(2-polyisobutylmethyl)allyl]morpholine. It was a dark viscous liquid which on analysis was found to have 1.28 percent bromine and 1.44 percent nitrogen.

Example 5

An autoclave was charged with 132.5 parts of polyisobutyl allylic chloride (prepared from polyisobutylene having a molecular weight of about 950), 250 parts of xylene, 12.2 parts of dimethylamine and 23 parts of potassium carbonate. The reactants were heated to 150° C. and kept at that temperature, with stirring, for 22 hours. The autoclave was discharged and the solution was allowed to cool. The cooled solution was then filtered and the solvent was vacuum distilled from the filtrate. A 90.7 percent yield of a mixture of N,N-dimethyl-1-polyisobutyl-2-methylallylamine, N,N-dimethyl-3-polyisobutyl-2-methylallylamine, and N,N-dimethyl - 2 - (polyisobutylmethyl)allylamine was obtained as a viscous dark liquid. Analysis showed the product to contain 0.83 percent nitrogen and 0.47 percent chlorine.

Example 6

A vessel equipped with a stirrer and condenser was charged with 975 parts of polyisobutyl allylic chloride (prepared from polyisobutylene having a molecular weight of about 950) 214 parts of diethanolamine and 166 parts of potassium carbonate. The mixture was stirred and heated to 125° C. After two hours, the temperature was raised to 175° C. and kept there for 16 hours. The reaction mixture was then cooled and dissolved in hexane. After filtering this solution, the hexane was removed by vacuum distillation. A 76.8 percent yield of a mixture of N,N-di(2-hydroxyethyl)-1-polyisobutyl - 2 - methylallylamine, N,N-di(2-hydroxyethyl)-3-polyisobutyl-2-methylallylamine and N,N-di(2-hydroxyethyl)-2-(polyisobutylmethyl)allylamine was obtained as a light brown viscous liquid. On analysis, the product was found to contain 0.59 percent nitrogen and 0.53 percent chlorine.

Example 7

A vessel equipped with stirrer and condenser is charged with 735 parts of polyisobutyl allylic chloride (prepared from polyisobutylene having a molecular weight of about 700), 392 parts of cyclohexylamine and 200 parts of benzene. The mixture is refluxed for 6 hours. Then the reaction mixture is filtered and the solvent is vacuum distilled. The product obtained is a mixture of N-cyclohexyl - 1 - polyisobutylallylamine, N-cyclohexyl-3-polyisobutylallylamine and N-cyclohexyl - 2 - (polyisobutylmethyl)allylamine.

Example 8

Into a vessel equipped with condenser and stirrer are charged 1135 parts of polypropyl allylic chloride (prepared from polypropylene having a molecular weight of about 1100), 219 parts of diethylamine and 300 parts of tetrahydrofuran. The mixture is heated to 80° C. and kept at this temperature for 8 hours. At the end of this time, the reaction mixture is filtered. The filtrate is then vacuum distilled to remove the solvent and unreacted diethylamine. The product obtained is a mixture of N,N-diethyl-1-polypropylallylamine and N,N-diethyl-3-polypropylallylamine.

Example 9

To a vessel equipped with a stirrer and condenser are added 930 parts of polyethylpropyl allylic bromide (prepared from a 40 percent ethylene/60 percent propylene copolymer having a molecular weight of about 850), 322 parts of di-n-butylamine and 100 parts of carbon tetrachloride. This mixture is kept at reflux with stirring for 10 hours. The mixture is then filtered and the filtrate is vacuum distilled to remove the solvent and unreacted cyclohexylamine. The product which is obtained is a mixture of N,N-di-n-butyl-1-polyethylpropylallylamine and N,N-di-n-butyl-3-polyethylpropylallylamine.

Another object of this invention is accomplished by providing a lubricant composition comprising a major portion of a lubricating oil and a minor portion of a polyolefin allylic amine having Formula I, II or III and mixtures thereof.

In preparing the lubricant compositions of this invention the required amount of polyolefin allylic amine is simply mixed with the lubricating oil using any suitable means. In order for the polyolefin allylic amine to be effective as a dispersant in the lubricating composition, it is preferred that the amount of polyolefin allylic amine is present in a range of from 0.1 to 20 percent by weight of the lubricating oil. The exact amount of additive in a particular composition is determined by the nature of the service which the lubricant will be subjected to and economic requirements. In addition to the polyolefin allylic amine, other commercially used oil additives such as viscosity index improvers, corrosion inhibitors, extreme pressure additives and the like may also be added.

The base oil which is useful in the lubricant composition is suitably selected from petroleum base oils and synthetic oils. Useful petroleum hydrocarbon oils are those obtained from the paraffinic, naphthenic, asphaltic and mixed base crudes, and/or mixtures thereof. Useful synthetic hydrocarbon oils include polymerized olefins, alkylated aromatics, isomerized waxes and the like.

The polyolefin allylic amines impart dispersancy properties to the lubricating oils to which they are added. The effectiveness of the polyolefin allylic amines of this invention as dispersants in the lubricating compositions was determined by preparing lubricant compositions and evaluating the dispersancy quality of these compositions as well as other compositions. The lubricating compositions were tested for their ability to disperse sludge using the following procedure.

The following ingredients are mixed for 15 minutes with stirring:

710 parts of sludge (obtained from oil oxidation bench test) 92 parts of oil (Mid Continent, dewaxed, solvent refined mineral oil)
2 parts of water
1 part of dispersant An emulsion generally is formed. This emulsion is then centrifuged in a 10″ radius centrifuge for two hours at 2000 r.p.m. At the end of this time, a sample is drawn off the top of the centrifuged mixture. The light transmission of this sample is then measured in a photometer. The reading obtained is expressed as percent light transmission.

The effectiveness of the dispersant is the inverse measure of the percent light transmission. Low percent light transmission indicates that the sludge is still dispersed in the oil and therefore that the additive is a good dispersant. On the other hand, if the percent light transmission is high, this indicates that the sludge is no longer dispersed in the oil. To illustrate, a base oil without a dispersant would have a light transmission reading of 70 to 100 percent, indicating poor dispersancy, whereas the same base oil with an effective dispersant in it would have a light transmission reading in this test of considerably less than 70 percent, indicating good dispersancy.

The following table contains the list of lubricant dispersants tested according to the procedure described above and the results obtained.

TABLE I

| Test No. | Polyolefin allylic amine additive prepared[1] from— | Polyolefin, MW* | Sludge as percent light transmission |
|---|---|---|---|
| 1 | None added | | 74 |
| 2 | Polyisobutylene and dimethylamine | 950 | 5 |
| 3 | do | 440 | 61 |
| 4 | Polyisobutylene and ammonia | 950 | 1 |
| 5 | Polyisobutylene and diethanolamine | 950 | 1 |

[1] The polyolefin allylic amine is prepared as per a process described above, as illustrated in Examples III through X. In the table, the polyolefin used to make the allylic halide, and the amine with which the allylic halide is reacted, are used to identify the particular polyolefin allylic amine additive which was tested.
*MW = average molecular weight.

It is readily apparent from the data in Table 1 that the polyolefin allylic amines of this invention are effective dispersants in lubricating oils.

In further considering the results shown in Table I, it is also evident that not all the polyolefin allylic amines have dispersant activity in lubricating oil. This is especially illustrated in the dispersant activity shown in Test No. 2 as compared with that shown in Test No. 3. The signal difference between the polyolefin allylic amine additives of these two compositions is the molecular weight of the polyolefin moiety. The polyolefin portion of the dispersant molecule in Test No. 3 has a molecular weight of 440 whereas the polyolefin portion of the dispersant molecule of Test No. 2 has a molecular weight of 950. The test results show the striking difference between the effectiveness of 2 over 3. The polyolefin allylic amine prepared from polyolefins of molecular weight 440 has no dispersancy power, while the allylic amine prepared from a polyolefin having a molecular weight of about 950 and above is an effective dispersant.

The polyolefin allylic amines of this invention are shown to be effective dispersants in lubricating oil, in engine tests also. The particular engine test procedure which was used to determine this fact is the Low Temperature Sludge and Varnish Test. This test measures the ability of an oil additive to control sludge and varnish formation in an internal combustion engine under low temperature operating conditions. These are the conditions which are encountered in normal stop and go city driving. These conditions are considered to be a very severe test of resistance to sludge and varnish formation. This Low Temperature Sludge and Varnish Test is conducted in a single cylinder engine. The engine is built with clean rings, bearings and pistons. This engine is then run with the particular oil composition to be tested and checks of the engine are made every 24 hours until a certain amount of sludge and/or varnish is formed. The end point of this test is taken to be the first slight indication of sludge and/or varnish build-up. This point is rated 9.0 where 10.0 indicates a completely varnish-free and/or sludge-free engine. The number of hours at which the 9.0 rating is reached is used as the test measure.

Results obtained in the Low Temperature Sludge and Varnish Test with oil compositions are shown in Table II below. The base oil is a Mid-Continent, solvent refined, dewaxed mineral oil.

TABLE II

| Test | Polyolefin allylic amine additive prepared[1] from— | Polyolefin, MW* | Hours to 9.0 sludge | Hours to 9.0 varnish |
|---|---|---|---|---|
| A | None added | | 26 | 60 |
| B | Polyisobutylene and [2] dimethylamine | 950 | 104 | +120 |

[1] See Table I footnote.
[2] 2 percent by weight was added to the oil.
*MW = average molecular weight.

The results of Table II show the significant increase in resistance to varnish and sludge formation obtained with an oil composition containing a polyolefin allylic amine additive of this invention. The base oil without any dispersant has a 9.0 rating for sludge after only 26 hours of running time. The lubricating oil containing the polyolefin allylic amine on the other hand must be run 120 hours before reaching the 9.0 varnish and sludge rating. The oil compositions of this invention are four times as effective in dispersing sludge as the oil containing no such additive.

The description of the invention and the test results given above clearly indicate that new dispersant additives for oils have been discovered. A novel method of preparing these dispersants has also been presented. The utility of these new additives as dispersants in lubricating oils is amply illustrated.

The foregoing disclosure therefore contains a complete statement of the present invention. It is desired that scope of the invention be limited only by the lawful extent of the following claims.

We claim:

1. Allylic amines selected from the group consisting of
   (A) compounds having the formula:

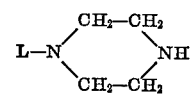

and
   (B) compounds having the formula:

wherein L is

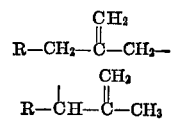

or

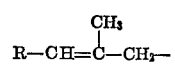

wherein R is an alkyl radical having a molecular weight from 700 to about 1400 and $R_1$ and $R_2$ are selected from the group consisting of halogen-substituted alkyls and —SH-substituted alkyls, said alkyls containing from 1 to 8 carbon atoms.

2. An allylic amine of Claim 1 wherein L is a branched-chain polyolefin radical.

3. An allylic amine of Claim 2 wherein said polyolefin radical is a polymer of isobutylene.

4. An allylic amine of Claim 1 wherein said allylic amine is an N-hydrocarbon-substituted piperazine.

5. An allylic amine of Claim 4 wherein said hydrocarbon substituent is a polymer of isobutylene.

6. An allylic amine of Claim 1 wherein said allylic amine has the formula:

wherein $R_1$ and $R_2$ are halogen-substituted alkyl radicals containing 1–8 carbon atoms.

7. An allylic amine of Claim 6 wherein L is a polymer of isobutylene.

8. An allylic amine of claim 1 wherein said allylic amine has the formula:

wherein $R_1$ and $R_2$ or —SH-substituted alkyl radicals containing 1–8 carbon atoms.

9. An allylic amine of Claim 8 wherein L is a polymer of isobutylene.

10. A lubricant composition comprising a major portion of a lubricating oil and a minor portion of an allylic amine of Claim 1.

11. A lubricant composition of Claim 10 wherein said allylic amine has the formula:

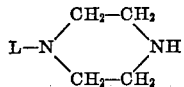

wherein R is an alkyl radical having a molecular weight from 700 to about 1400.

12. A lubricant composition of Claim 11 wherein L is a branched-chain polyolefin radical.

13. A lubricant composition of Claim 12 wherein L is a polymer of isobutylene.

14. A lubricant composition of Claim 10 wherein said allylic amine has the formula:

wherein L is a polymer of isobutylene having a molecular weight of from 700 to about 1400.

15. A lubricant composition of Claim 14 wherein $R_1$ and $R_2$ are halogen-substituted alkyls containing 1–8 carbon atoms.

16. A lubricant composition of Claim 14 wherein $R_1$ and $R_2$ are —SH-substituted alkyls containing 1–8 carbon atoms.

References Cited
UNITED STATES PATENTS 3,219,666  11/1965  Norman et al. ____ 251—51.5 A
3,275,554  9/1966  Wagenaan _____ 252—50

PATRICK P. GARVIN, Primary Examiner

U.S. Cl. X.R.

252—50, 51, 51.5 R; 260—243 B, 247, 268 R, 293, 584 R, 583 EE, 583 G

UNITED STATES PATENT OFFICE
CERTIFICATE OF CORRECTION

Patent No. 3,822,209    Dated July 2, 1974

Inventor(s) Gordon G. Knapp and Norman A. Le Bel

It is certified that error appears in the above-identified patent and that said Letters Patent are hereby corrected as shown below:

Claim 8, at line 11 of column 11, "or" should read -- are -- .

Signed and sealed this 29th day of October 1974.

(SEAL)
Attest:

McCOY M. GIBSON JR.
Attesting Officer

C. MARSHALL DANN
Commissioner of Patents